United States Patent
Fencil

[19]

[11] Patent Number: 6,158,321

[45] Date of Patent: *Dec. 12, 2000

[54] INTERNAL MITER SAW MEANS AND METHOD FOR CUTTING A WORKPIECE TO LENGTH WITHOUT THE NEED TO MEASURE

[76] Inventor: Adam Blase Fencil, 26843 Calaroge Ave., Hayward, Calif. 94545

[*] Notice: This patent issued on a continued prosecution application filed under 37 CFR 1.53(d), and is subject to the twenty year patent term provisions of 35 U.S.C. 154(a)(2).

[21] Appl. No.: 08/943,685

[22] Filed: Oct. 3, 1997

[51] Int. Cl.⁷ .................................................. B27B 9/04
[52] U.S. Cl. .................................. 83/745; 83/581; 83/574
[58] Field of Search ............................... 83/745, 574, 581

[56] References Cited

U.S. PATENT DOCUMENTS

| | | | |
|---|---|---|---|
| 2,876,808 | 3/1959 | Lindheim | 83/574 |
| 3,124,175 | 3/1964 | McCloud | 83/581 |
| 3,842,700 | 10/1974 | Novak | 83/743 |
| 4,050,340 | 9/1977 | Flanders | 83/743 |
| 4,054,077 | 10/1977 | Gram | 83/745 |
| 4,320,678 | 3/1982 | Volk | 83/574 |
| 4,328,728 | 5/1982 | Ferdinand et al. | 83/471.3 |
| 4,751,865 | 6/1988 | Buckalew | 83/745 |
| 4,920,845 | 5/1990 | Blanchette | 83/574 |
| 5,148,730 | 9/1992 | McCaw | 83/745 |
| 5,226,345 | 7/1993 | Gamble | 83/745 |
| 5,537,903 | 7/1996 | Brewer | 83/471.3 |

FOREIGN PATENT DOCUMENTS

| | | | |
|---|---|---|---|
| 3540410 | 5/1987 | Germany | 83/581 |
| 3915376 | 11/1990 | Germany | 83/581 |
| 4323640 | 1/1995 | Germany | 83/581 |

*Primary Examiner*—M. Rachuba
*Assistant Examiner*—Stephen Choi

[57] ABSTRACT

The present invention is an internal miter saw having an apparatus and a method for cutting multiple workpieces at the job site to predetermined correct lengths and predetermined correct mitered angles to form an inner mitered joint perimeter along an existing external frame. The internal miter saw of the invention accomplishes this by providing a frame which is adapted for mounting a movable saw blade above the frame at a fixed position.

3 Claims, 4 Drawing Sheets

ISO VIEW

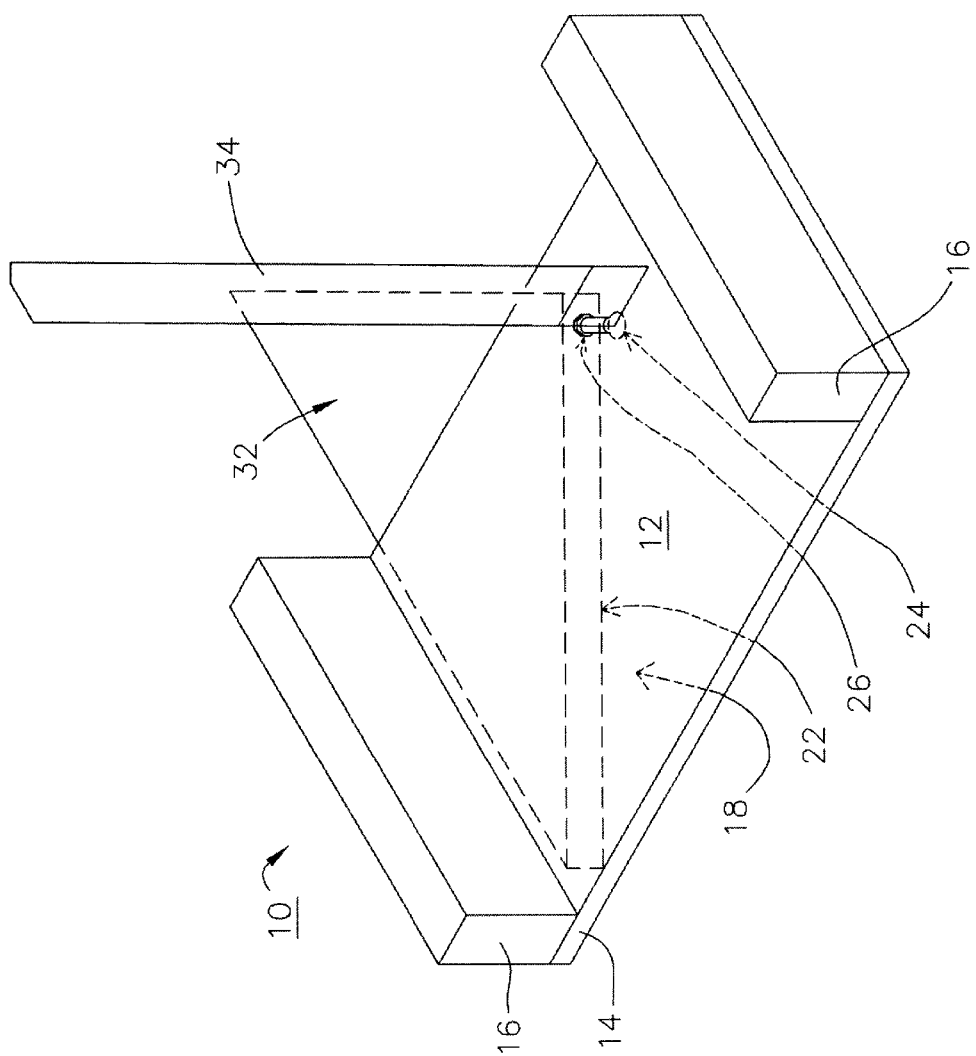

BACK VIEW

SIDE VIEW

TOP VIEW

INTERNAL MITER SAW MEANS AND METHOD FOR CUTTING A WORKPIECE TO LENGTH WITHOUT THE NEED TO MEASURE

BACKGROUND OF THE INVENTION

1. Field of the Invention

The Invention relates in general to miter saws and more specifically to an internal miter saw having means and a method for cutting multiple workpieces at the workpiece to any/various unknown lengths and angles to form an inner mitered joint perimeter along an existing external frame.

2. Description of the Related Art

It has long been a Craftsman's scourge that the steps necessary to measure and cut a workpiece to length include a necessary amount of error and intolerance. For this reason, saws, especially power saws such as circular saws, jigsaws and table saws often include workpiece guides and fences to facilitate multiple cuts and help reduce the intolerance of the cut piece. A search of the prior art identified the following references as examples:

U.S. Pat. No. 5,390,425 is directed to a saw guide measuring square. The complexity of this device teaches away from the present invention. It also demonstrates the value of the present invention.

U.S. Pat. No. 5,427,006 is directed to a hand held circular saw guide that enables the operator to make straight cross and angled cuts.

U.S. Pat. No. 5,566,456 is directed to a saw guide base plate.

U.S. Pat. No. 5,537,903 is directed to a portable power saw guide.

U.S. Pat. No. 5,385,183 is directed to a tool for producing a straight edge.

U.S. Pat. No. 5,181,448 is directed to a miter saw with an adjustable workpiece supporting fence.

For the most part, the above examples and others lend themselves to replicating cuts and multiple cuts in workpieces, which cut workpiece has a tolerance that is fine for most applications. However applications for which gross tolerance is not suitable are butt joints and miter joints, especially in the field of fine finish woodworking. A slight excess length and the workpiece just will not physically fit in place, but at least the craftsman can trim off the excess length. A slight shortness in length and the workpiece will not look suitable when placed in the joint and there is no remedy. A new workpiece must be cut at the correct length, and the whole process starts over again. In order to compensate for the close tolerances necessary for these butt and miter joints, the craftsman will perform multiple excess length cuts in the workpiece, fitting the workpiece to ever closer tolerances, until he has achieved the perfect fit. Alternately, the craftsman may chose to sand the workpiece to length to achieve the perfect fit in the joint.

Another problem associated with forming miter and butt joints is that while power saw equipment and even a miter box can cut the correct angle for the joint at a remote location, nowhere to be found is means or methods for solving this mitering/measuring problem at the workpiece.

Accordingly, it would be desirable to have means and methods for cutting multiple workpieces at the workpiece to predetermined correct lengths and predetermined correct mitered angles to form an inner mitered joint perimeter along an existing external frame.

It would further be desirable if the means and methods of the invention take advantage of the existing interior measurement at the workpiece by having the internal miter saw tool of the invention reference one side of the workpiece and have the workpiece itself reference the opposite side of the workpiece.

SUMMARY OF THE INVENTION

Briefly the present invention is an internal miter saw having means and a method for cutting multiple workpieces at the job site to predetermined correct lengths and predetermined correct mitered angles to form an inner mitered joint perimeter along an existing external frame. The internal miter saw of the invention accomplishes this by providing a frame which is adapted for mounting a movable saw blade above the frame at a fixed position; and includes both a means for positioning the movable saw blade along the workpiece at a desired predetermined position relative to a fixed end of the workpiece, and a means for positioning the workpiece at a predetermined angle relative to the movable saw blade. These means for positioning the movable saw blade along the workpiece at a desired predetermined position relative to a fixed end of the workpiece, and the means for positioning the workpiece at a predetermined angle relative to the movable saw blade function independently of each other wherein the means for positioning the workpiece at a predetermined angle relative to the movable saw blade includes a guide plate disposed on the top of said frame at said predetermined angle relative to said movable saw blade, and wherein the means for positioning said movable saw blade along the workpiece at a desired predetermined position relative to a fixed end of the workpiece includes a butt plate disposed on the bottom of the frame for butting against a fixed stop when the movable saw blade is at the desired predetermined position relative to the fixed end of the workpiece. Preferred embodiments of the invention include disposing the guide plate and the butt plate perpendicular to each other and disposing an adjustable fine positioning bolt with lock-nut on the butt plate to provide for cutting the workpiece at close tolerant lengths.

BRIEF DESCRIPTION OF THE DRAWINGS

FIG. 1 is an isometric view of the internal miter saw apparatus constructed according to the teachings of the invention, with the power saw portion removed for illustration of the miter jig which has means for cutting multiple workpieces at the job site to predetermined correct lengths and predetermined correct mitered angles to form an inner mitered joint perimeter along an existing external frame;

DESCRIPTION OF THE PREFERRED EMBODIMENTS OF THE INVENTION

Figure 3:
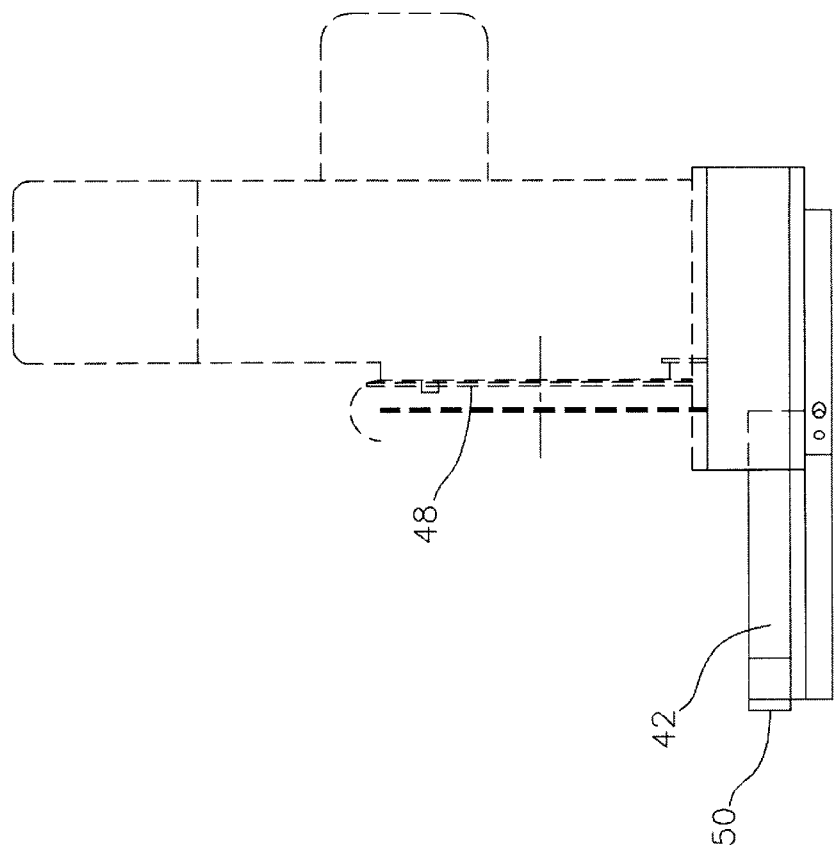
FIG. 3 is a back view of the internal miter saw apparatus constructed according to the teachings of the invention of FIG. 3 with the power saw portion attached illustrating the offset of a guide plate disposed on the top of the miter jig frame at a predetermined angle relative to the movable saw blade.

Referring now to the drawings and to FIG. 1 in particular there is shown an isometric view of the internal miter saw apparatus 10 constructed according to the teachings of the invention. Internal miter saw apparatus 10 includes frame 12 including base plate 14 and left and right saw mounting supports 16. On the bottom side 18 of base plate 14 there is disposed by screw mount, glue, rivet etc.. frame butt plate 22 having fine adjustment screw 24 and locking nut 26 disposed thereon. As will be explained more fully infra with reference to FIGS. 4 and 5, frame butt plate 22 and adjustment screw 24 are used to position the movable saw blade of internal saw apparatus 10 directly above the location of a miter cut on a workpiece to form an inner mitered joint perimeter along an existing external frame. On the top side 32 of base plate 14 there is disposed by screw mount, glue, rivet etc.. frame guide bar 34 which extends out and back of base plate 14 so as to position the workpiece at the correct angle for the miter cut and also at the correct length to form an inner mitered joint perimeter along an existing external frame as will also be explained more fully infra with reference to FIGS. 4 and 5.

Figure 2:
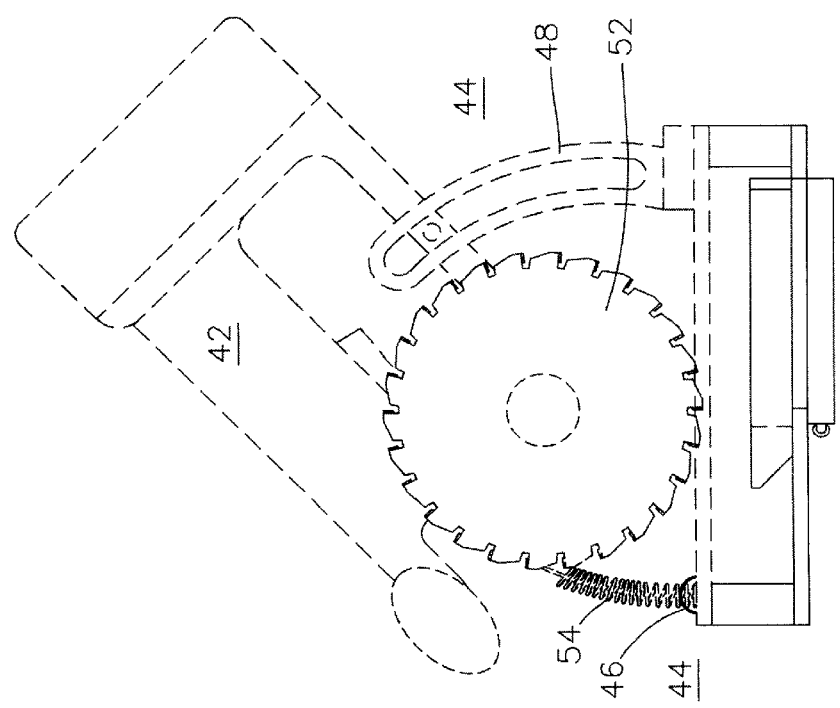
FIG. 2 is a side view of the internal miter saw apparatus constructed according to the teachings of the invention, with the power saw portion attached illustrating a guiding means which includes a pivot axis and a radial guide way disposed concentric with the pivot axis for guiding a circular saw radially downward to guide a movable saw blade through the miter cut in the workpiece.

Referring now to FIGS. 2 there is shown a side view of the internal miter saw apparatus 10 constructed according to the teachings of the invention, with the power saw portion 42 attached illustrating a downward guiding means 44 which includes a pivot axis 46 and a radial guide way 48 disposed concentric with the pivot axis for guiding a circular saw 42 radially downward to thereby guide movable saw blade 52 through the workpiece. Return spring 54 extends when circular saw 42 is biased downward and retracts and returns circular saw 42 to its elevated resting position when the operator stops his/her downward biasing of circular saw 42.

Referring now to FIG. 3 there is shown a back view of the internal miter saw apparatus 10 of FIG. 3 further illustrating radial guide way 48 as well as the outward offset extension 50 of frame guidebar 42.

Figure 4:
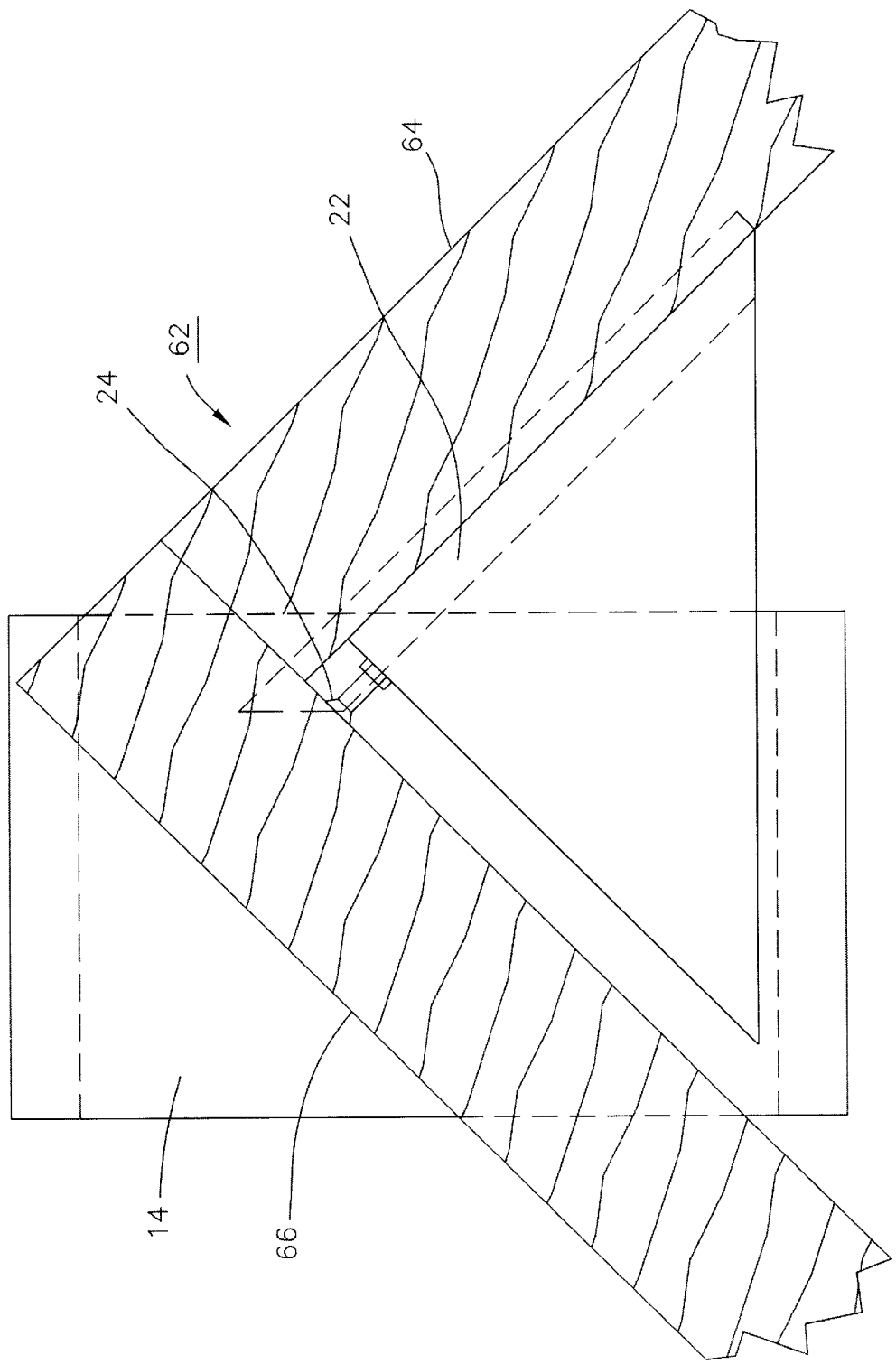
FIG. 4 is a bottom plan view of the internal miter saw apparatus constructed according to the teachings of the invention, with the power saw portion removed for illustration of the miter jig's placement and positioning within an external wooden frame to provide for one step measuring and miter cutting of a workpiece for forming an inner peripheral mitered joint perimeter along an existing external frame having internal convex angles.
Figure 5:
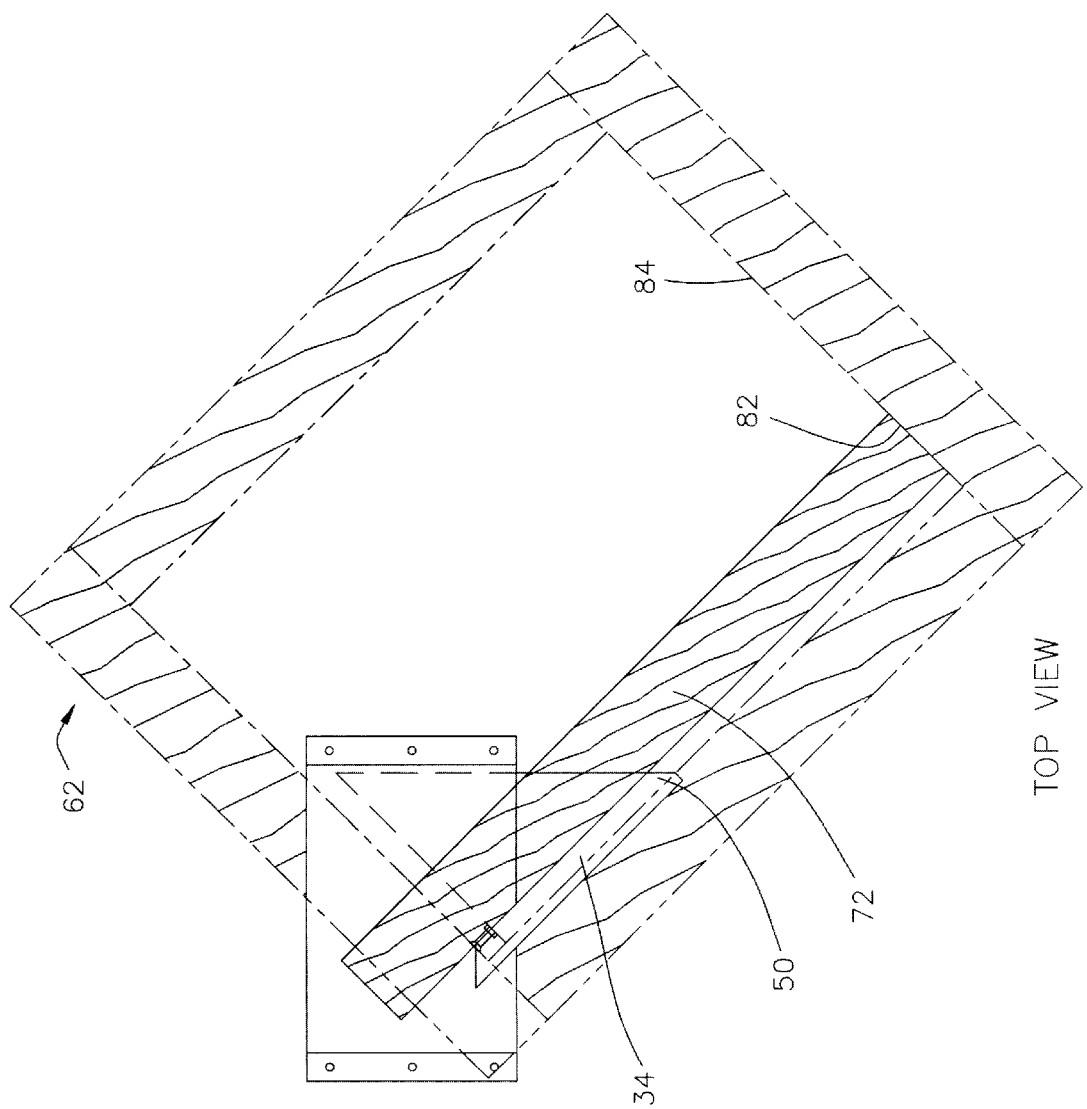
FIG. 5 is a top plan view of the internal miter saw apparatus of FIG. 4 again for illustration of the miter jig's placement and positioning within an external wooden frame to provide for one step measuring and miter cutting of a workpiece for forming an inner peripheral mitered joint perimeter along an existing external frame having internal convex angles.

The operation of internal miter saw apparatus 10 to form an inner mitered joint perimeter along an existing external frame will be explained with reference to FIGS. 4 and 5 wherein there is shown an existing wooden frame 62 for which it is desired to cut multiple workpieces at the correct lengths and angles for installing the mitered joint perimeter. Please note that frame 12 is positioned and rest on top of existing wooden frame 62 in FIGS. 4 and 5. Referring now to FIG. 4, wherein the bottom side of existing wooden frame 62 and internal miter saw apparatus 10 are illustrated, frame butt plate 22 is placed along side 64 of existing wooden frame 62 until fine adjusting screw 24 butts against side 66 of existing wooden frame 62. At this location saw blade 52 of circular saw 42 is positioned just above the position of the miter cut. Referring now to FIG. 5 wherein the top side of existing wooden frame 62 and internal miter saw apparatus 10 are illustrated, with saw blade 52 at the correct position for the miter cut. Now guide bar 34 positions wooden workpiece 72 at the correct angle for the miter cut when wooden workpiece 72 is positioned along and pressed against guide bar 34. Referring now to FIG. 1, please note that guide bar 34 is disposed on the top side 32 of base plate 14. Referring now to FIGS. 4 and 5 and especially to FIG. 5, the bottom side 18 of base plate 14 rest on the top of existing wooden frame 62. It can be readily understood therefore, that guide bar 34 in the resting position is disposed above side 64 of existing wooden frame 62 a distance equal to the thickness of base plate 14, which in the preferred embodiment is approximately ¼ inch thick. The operator of internal miter saw 10 then may simply apply a small downward force on the outward offset extension 50 of guide bar 34 and twist the internal miter saw apparatus 10 a few degrees relative to the position(usually horizontal) of existing wooden frame 62, thereby allowing the opposite end from the miter cut 82 of workpiece 72 to also tilt slightly and fit snugly against side 84 of existing wooden frame 62 to provide an exact cutoff length of workpiece 72 to fit the perimeter alongside side 64 of existing wooded frame 62. Referring now to FIG. 2 and three, with saw blade 52 now in the correct position to cut workpiece 72 to the correct length at the correct miter angle, the operator must only push circular saw 42 downward against return spring 54 to complete the miter cut in workpiece 72.

In conclusion, there has been disclosed an internal miter saw having a base plate jig including both length positioning and miter angle positioning means that will allow an operator to cut a miter angle and to correct length in a workpiece with one simple positioning step. Although the preferred embodiments are directed to 90° angles mitered to 45° cuts, the invention is not to be considered so restricted. The invention is broadly applicable to any length and angle that can be cut on a workpiece. For instance, referring now to FIG. 4, if existing frame 62 were octagonal, hexagonal, or any other polygon, the correct length could be provided by simply adjusting adjustment screw or changing the shape of frame butt plate 22. Likewise, referring now to FIG. 5, the alternate necessary miter angles, including 90° for a butt joint, could readily be obtained by disposing guide bar 34 (shown at 90° to the touching side of butt plate 22) at any predetermined angle to saw blade 52.

I claim:

1. An internal cut miter saw guide for positioning a movable saw blade at a predetermined angle and location along a workpiece, comprising:

a) a frame having a surface with top, bottom and opposing sides for mounting said movable saw blade above said frame surface at a fixed position;

b) a butt plate attached to the bottom surface of said frame for butting against a fixed stop when said frame has positioned said movable saw blade along said workpiece at a predetermined position relative to a fixed end of said workpiece to provide for cutting said workpiece at a desired position relative to the fixed end of said workpiece; and c) a guide bar attached to the top surface of said frame, said guide bar and said butt plate being generally perpendicular to the surface for positioning said workpiece at a predetermined angle relative to said movable saw blade to provide for cutting said workpiece at said predetermined angle relative to said movable saw blade.

2. The internal cut miter saw guide of claim 1, wherein said butt plate further includes an adjustable standoff screw disposed on said butt plate to provide for fine positioning of said movable saw blade with respect to the workpiece.

3. A portable internal miter saw for cutting multiple workpieces at the job site to predetermined correct lengths and predetermined correct mitered angles to form an inner mitered joint perimeter along an existing external frame having internal convex angles, said inner mitered joint perimeter having interior miter cut angles corresponding to said frame internal convex angles, comprising:

a) a circularly rotating saw blade;

a) a frame having a surface with top, bottom and opposing sides for mounting said movable saw blade above said frame surface at a fixed position;

b) a butt plate attached to the bottom surface of said frame for butting against a fixed stop when said frame has positioned said movable saw blade along said workpiece at a predetermined position relative to a fixed end of said workpiece to provide for cutting said workpiece at a desired position relative to the fixed end of said workpiece;

c) a guide bar attached to the top surface of said frame, said guide bar and said butt plate being generally perpendicular to the surface for positioning said workpiece at a predetermined angle relative to said movable saw blade to provide for cutting said workpiece at said predetermined angle relative to said movable saw blade; and wherein said circularly rotating saw blade is movably disposed above said frame such that said rotating saw blade may be moved downward by an operator so as to cut through said multiple workpieces.

* * * * *